United States Patent

Kent et al.

[11] 3,881,226
[45] May 6, 1975

[54] CLEANING AND DISCHARGE MECHANISM FOR COTTON HARVESTER

[75] Inventors: Brian Elwood Kent; Leon Franklin Sanderson, both of Des Moines, Iowa

[73] Assignee: Deere & Company, Moline, Ill.

[22] Filed: July 27, 1973

[21] Appl. No.: 383,359

Related U.S. Application Data

[63] Continuation of Ser. No. 124,161, March 15, 1971, abandoned.

[52] U.S. Cl. .................................... 19/203; 56/30
[51] Int. Cl. ............................................ D01b 3/00
[58] Field of Search ............... 19/200, 202–205; 56/28, 30, 33, 36

[56] References Cited
UNITED STATES PATENTS

| | | | |
|---|---|---|---|
| 3,355,776 | 12/1967 | Reddick | 19/202 |
| 3,397,522 | 8/1968 | Sanderson et al. | 56/30 |
| 3,512,237 | 5/1970 | Elderman et al. | 19/202 X |

*Primary Examiner*—Dorsey Newton

[57] ABSTRACT

For use with a cotton harvester, a chamber for receiving material from the harvester and a discharge conduit extending from the chamber. A blower for directing air through the conduit and inducing a secondary stream of air in the chamber that picks up the cotton bolls and moves them toward the conduit. A series of rotary-type cleaning blades traversing the chamber above the discharge means from the harvester and on which cotton bolls impinge as they move in the induced secondary stream of air. The blades have peripheral teeth that snag onto the bolls and draw them across an associated grate for removing solid material, twigs and other trash accumulated with the cotton.

6 Claims, 5 Drawing Figures

INVENTORS
B. E. KENT
L. F. SANDERSON
BY William A. Murray
ATTORNEY 3,881,226

CLEANING AND DISCHARGE MECHANISM FOR COTTON HARVESTER

This is a continuation of application Ser. No. 124,161, filed Mar. 15, 1971, now abandoned.

BACKGROUND OF THE INVENTION

This invention relates to a cotton harvester and more particularly to the type of cotton harvester in which cotton is discharged in a comingled mixture of ripe and green bolls into a chamber. More particularly, the invention relates to a cotton cleaning device located in the chamber and which utilizes rotary blades moving across the normal flow of cotton to snag the cotton and move the cotton across a cleaning grate.

The use of cotton cleaning devices in the discharge mechanism of cotton harvesters are known to be old. The two conventional ways of utilizing a cotton cleaner is to place the cleaner in the discharge conduit or at the end of the conduit so as to receive the cotton bolls through the conduit and following cleaning to dispatch the cleaned bolls into an awaiting container.

The problem with placing the cotton directly in the air stream coming from the main fan is that the cotton must be forced through the duct at relatively high velocity and consequently it enters the area of the cleaner at high velocity. Normally the velocity is not controlled since it is the conventional purpose of the fan and its conduit to move the cotton into the area of the cleaner. This, of course, often creates additional problems since the cotton will become stained if it is handled vigorously as it enters the cleaner and consequently the effect of the cleaning by the cleaner itself is often compromised.

SUMMARY OF THE INVENTION

With the above in mind, it is the primary object of the invention to provide a chamber at the discharge area of the cotton harvester and to provide cleaning wheels in the chamber above the discharge means of the cotton harvester. The chamber opens upwardly into the base of a conduit and a fan is directed into the conduit toward the upper discharge end. This induces a secondary stream in the chamber which draws the cotton upwardly against the peripheries of the wheels and their teeth to snag the cotton and draw it across a cleaning grate. Beneath the cleaner and above the discharge means of the cotton harvester is an air regulating means in the form of a vent which regulates the intensity of the air moving through that part of the chamber beneath the vent. Thus, the heavier trash as well as the green bolls will be eliminated by adjusting the vent so that they will not be picked up in the secondary stream. The ripened cotton bolls picked up in the secondary or undirected stream of air then moved onto the periphery of the wheels where they are drug across a grate to remove the remaining trash therefrom. Also, above the rotary blades are doffer means for removing the cotton bolls from the teeth and redirecting them back into the path of the secondary stream and eventually into the primary stream.

It is also an object of the present invention to provide a secondary-type of cleaning with additional blades with peripheral teeth which are positioned to receive the trash and incidental lint passing through the grate and to pass them adjacent and against a second grate which further separates the trash. Remaining lint on the secondary blades is removed by a conventional-type doffer which moves the lint first upwardly to the primary doffer and from there into the chamber and conduit.

DESCRIPTION OF THE PREFERRED EMBODIMENT

Figure 1:
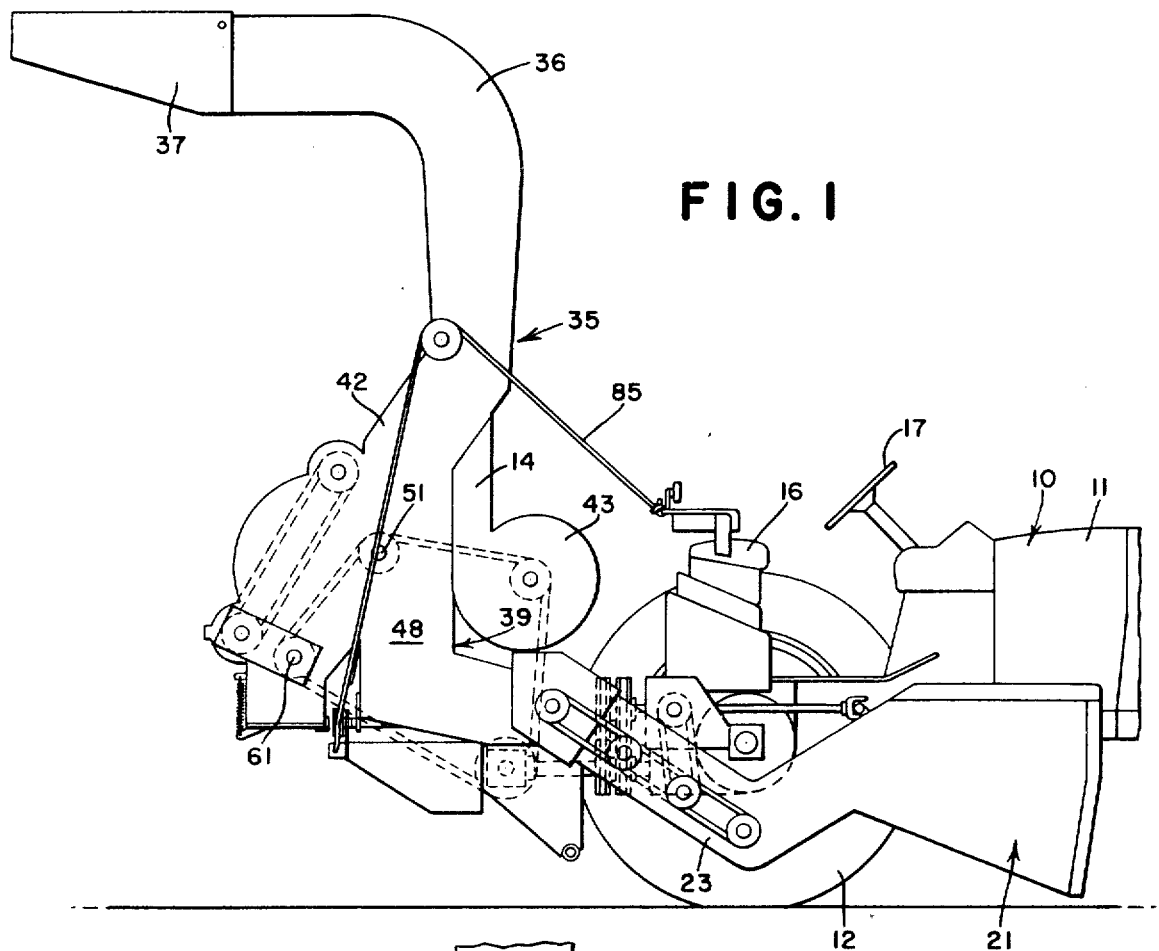
FIG. 1 is a side view of a harvester incorporating the present discharge and cleaning conveyances and including a portion of a tractor.
Figure 3:
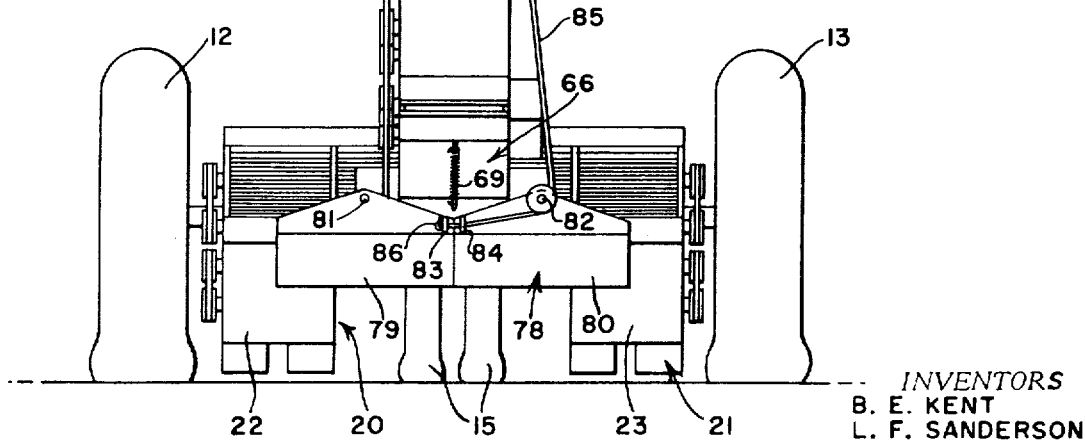
FIG. 3 is a rear view of the combination tractor and harvester.

The cotton harvester herein to be described is supported on a main support or tractor 10 having a fore-and-aft extending body 11 and carried on traction wheels 12, 13 on opposite ends of a transverse axle structure 14. The tractor body is supported at its forward end by steerable wheels 15. An operator's station, as indicated by a seat 16 and steering wheel 17, is provided on the tractor body 11.

The harvester is composed of a pair of row units 20, 21 positioned on opposite sides of the tractor body 11 and forwardly of the axle structure 14. The harvesting row units may be of any of many conventional units. In this respect, U.S. Pat. No. 2,533,510 which issued to M. W. Roscoe on Dec. 12, 1950 shows and describes one commercial type of harvester. Generally, the harvester is composed of a forward harvesting mechanism disposed forwardly of the traction wheels 12, 13 that contacts the cotton plants and dislodges the cotton bolls from the plants. The cotton bolls are then transferred into a cleaning-conveying mechanism on the side of the harvesting mechanism and dispatched rearwardly to a pair of elevators 22, 23 extending from lower intake ends beneath the axle structure 14 upwardly and rearwardly to a pair of transversely spaced discharge ends rearwardly of the traction wheels.

A transverse auger structure 25 extends between the discharge ends of the elevators 22, 23 and includes an auger housing having a front overhead closed portion 26 and a rear underlying grille portion 27, the latter forming with the housing portion 26 a transverse tube for receiving an auger device 28. The auger device 28 includes a pair of spiral helical flightings 29, 30 that feed material from the discharge ends of the elevators 22, 23 to a central impeller portion 31. The impeller portion 31 is composed of a series of radial paddles that receive the cotton and drive it rearwardly through a centrally located rear outlet 32.

Positioned rearwardly of the transverse auger structure 25 and directly in line with the outlet 32 is an upright cotton cleaning and conveying mechanism including a vertical duct structure 35 having at its upper end an elbow 36 for redirecting material horizontally rearwardly through a discharge spout 37. In many cotton harvesters there is provided a cotton-receiving basket in overhead relation to the tractor 10 and consequently if it is desired to have the duct structure and its upper elbow directed forwardly such may be done by adjusting the elbow.

Figure 2:
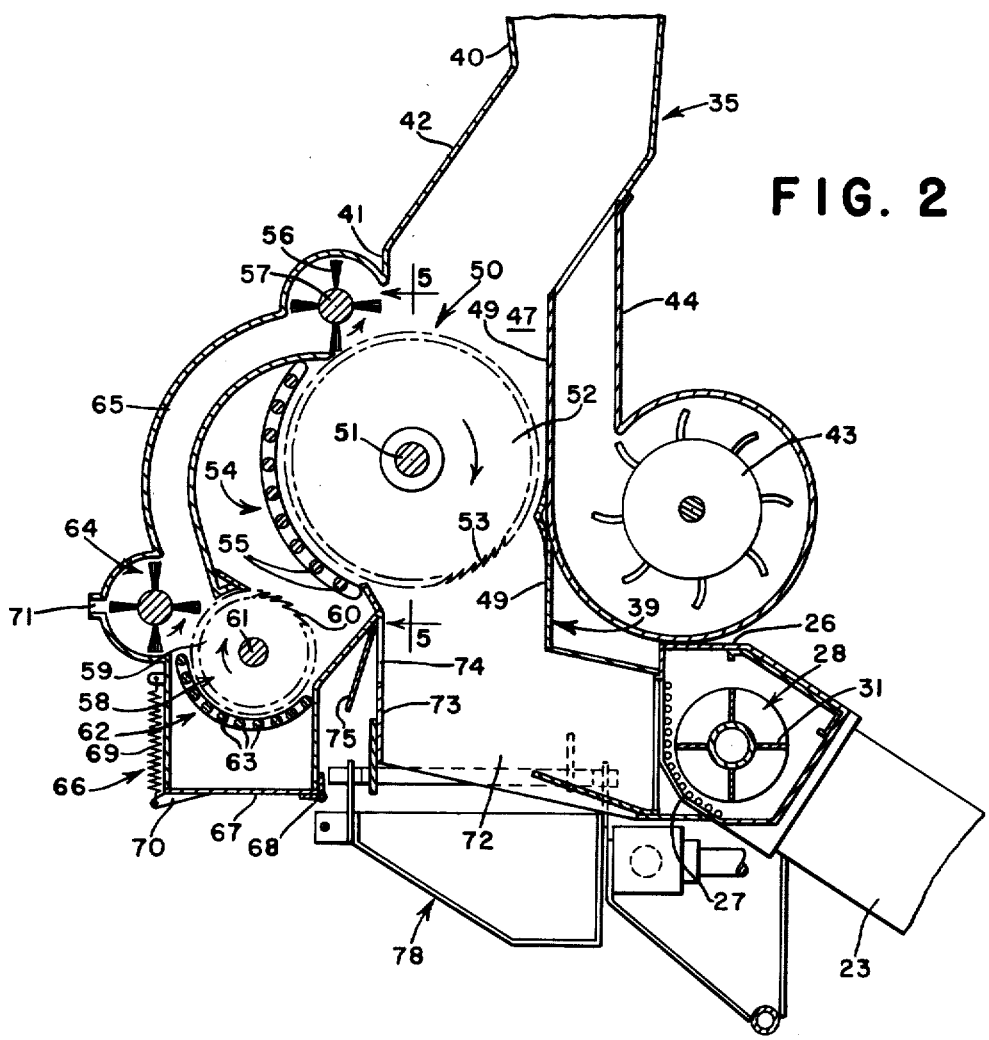
FIG. 2 is an enlarged vertical sectional view through a portion of the discharge conveying and cleaning mechanism.
Figure 5:
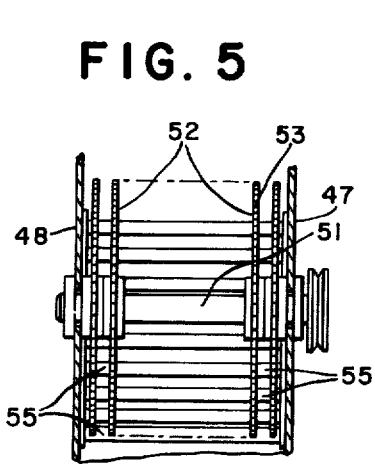
FIG. 5 is a sectional view taken substantially along the line 5—5 of FIG. 2.
Figure 4:
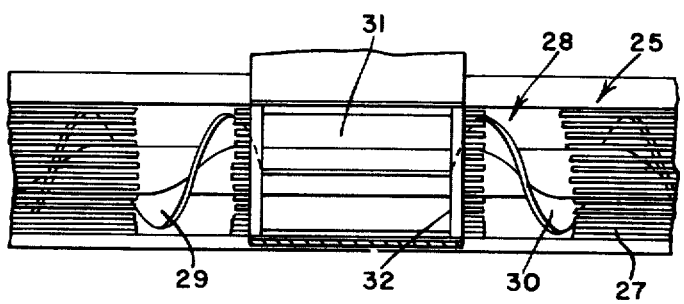
FIG. 4 is a sectional view taken substantially along the line 4—4 of FIG. 2.

The duct structure 35 extends from a lower end 39 that receives material from the cross auger 25 to an upper discharge end at the spout 37. Part of the duct structure 35 includes an upper vertically extending conduit 40 and a lower cleaning and separating chamber 41 which opens upwardly into the lower end of the conduit 40. The chamber 41 is offset rearwardly from the conduit 40 and is connected thereto by an inclined conduit extension portion 42. Supported on the upper end of the housing portion 26 is a fan 43 having a nozzle 44 opening into the inclined portion 42 and directed upwardly and centrally of the main conduit 40. The chamber 41 has left and right transversely spaced upright walls 47, 48 respectively joined by a front wall 49. Extending across the chamber 41 and journaled on the walls 47, 48 is a cleaning wheel 50 composed of a central shaft 51 and a series of axially spaced sawtype blades 52, each having a peripheral toothed edge 53. Positioned rearwardly of the wheel 50 and adjacent the rear side thereof is an arcuate-shaped grate 54 composed of a series of vertically spaced horizontal rods 55 that extend between the walls 47, 48 and are fixed thereto. As may be seen from viewing FIG. 2, the purpose of the grate 54 is to remove foreign objects, twigs, leaves and other foreign matter from the cotton as it is snagged on the teeth 53 and drawn across the grate 54. Disposed above and slightly to the rear of the wheel 50 is a rotary doffer brush 56 having its bristles engageable with the teeth 53 of the respective blades 52. The direction of rotation of the doffer 56 is shown in FIG. 2 and directs the cotton removed from the teeth 53 into the inclined portion 42 of the duct structure. The doffer 56 has a central shaft 57 supported on the respective walls 47, 48.

Also contained in the chamber 41 is an open space located rearwardly of the grate 54 that receives the trash and incidental lint passing through the grate. This material falls on a second cleaner wheel 58 having a series of rotary blades 59 with peripheral teeth 60, supported on a driven shaft 61. The shaft 61 is also journaled for rotation in the respective walls 47, 48. Beneath the wheel 58 is an arcuate-shaped grate 62 composed of a series of angularly-spaced transverse horizontal rods 63. In a manner similar to the cleaning wheel 50, the blades 59 contact the lint and other material that can be saved and draw the trash as well as the lint over the grate 62 where a second cleaning occurs. Positioned rearwardly of the cleaner wheel 58 is a second doffer brush 64 which removes the lint from the teeth 60 and directs it upwardly into an arcuate-shaped conduit 65 that empties into the upper doffer 56.

Trash passing between the rods 63 is caught in a box-like container 66 having a bottom door 67 hinged at 68 for purposes of cleaning. The door is normally held in position by a spring 69 extending between the upper portion of the box 66 and a bracket 70 extending rearwardly and downwardly from the door 67. The door 67 may be held in its open position when desired although in most instances and in normal operation of the entire conveying system the door 67 is closed. The chamber 41 is closed except for a small air inlet 71 behind and feeding into the doffer 64 and a large discharge opening 72 at the base of the chamber. A transverse panel 73 extends between the walls 47, 48 and is positioned rearwardly of the impeller 31 so that the cotton being thrown by the paddle 31 will strike the panel 73. The panel 73 terminates at an upper edge beneath the grate 54 so as to provide a small air inlet 74. The air intake or opening 74 may be closed by a baffle 75. The baffle 75 is adjustable so as to regulate the amount of air moving through the opening 74.

Positioned beneath the opening or outlet 72 is a green boll container 78. The container 78 is composed of two complementary portions 79, 80 having front and rear upright sides pivoted on fore-and-aft extending pivot rods 81, 82. The container portions 79, 80 are separable along a vertical fore-and-aft extending plane substantially on the fore-and-aft center line of the tractor. A pair of brackets 83, 84 project rearwardly from the rear wall of the respective portions 79, 80 and are suitably apertured so as to receive a line or rope 85. The rope has a knot 86 at the end passing through the apertures and extends therefrom upwardly over a pulley 87 that redirects the line for connection to the tractor seat 16. When it is decided to dump or discharge green bolls in the container 78, slack is played into the rope 85 and the gravitational effect of the containers and the material in the containers will cause the central or inner portions of the container portions 79, 80 to tilt or to dump the material. When it is desired to again place the portions 79, 80 in transverse horizontal alignment, tension is applied in the rope 85 and the two sections move into the desired position.

The cotton cleaner and conveying mechanism operates in the following manner. Ripe and green cotton bolls are moved in a comingled mixture by the impeller 31 until they strike the upright panel 73. The secondary or induced stream of air that is induced by the primary stream of air passing from the nozzle 44 of the fan 43 gently picks up the ripe cotton bolls while the greener or heavier bolls separate and drop through the outlet 72 into the containers 79, 80. The bolls impinge against the blades 52 and are snagged by the teeth 53 to be drawn across the grate 54. Twigs, leaves and other foreign particles move between the rods 55 and onto the saw blades 59. Also, however, incidental lint and a few bolls passing between the rods 55 are again snagged by the teeth of the blades 58 and drawn across the rods 63. A second doffer removes the lint and incidental bolls and moves it up through the duct 65 to the upper doffer 56. The doffer 56 also operates to remove the bolls snagged on the teeth 53 and can divert or throw the bolls into the conduit structure to be eventually picked up by the main stream of air issuing from the fan 43. It should here be noted that the entire chamber 41 is closed except for the small opening 71, the outlet 72 and the air passage 74. The opening 71 is sufficiently large to provide an induced air movement in the duct 65. Since separation of ripe bolls from the green bolls and heavier foreign material occurs adjacent the panel 73, the intensity of the induced air stream at the separation area may be regulated by opening or closing the panel 75 in relation to the air opening 74.

FIG. 1 shows the various drives to the various mechanisms of the conveying and cleaning units. While not shown in detail, it is believed that any type of drive mechanism and several types of drive mechanisms could be utilized for purposes of operating the fans, doffers and rotating blades and consequently the details of the drive are not believed necessary. However, reference may be made to FIG. 1 for purposes of showing the general drive mechanism.

We claim:

1. A cotton discharge mechanism for a cotton harvester in which cotton is discharged in a stream of comingled mixture of ripe and green bolls, a vertical duct having a lower end adjacent to and opening downwardly to the stream and extending upwardly to a discharge end; a blower having an outlet opening into the duct spacedly above its lower end and directed toward the discharge end and effective to induce a secondary air stream into the lower portion of the duct beneath the outlet for drawing the ripened bolls from the comingled mixture; a rotary cotton cleaner wheel supported in the duct and composed of a drive shaft traversing the duct adjacent its lower end and a plurality of vertically disposed cleaner blades supported on the shaft and spaced axially therealong to provide vertical spacings therebetween through which the secondary air stream may pass, said blades having peripheral teeth thereon on which the ripened bolls impinge as they move upwardly in said secondary air stream; a grate structure alongside the wheel against which the ripe bolls are drawn for removing trash therefrom; means for removing the ripened bolls from the wheel and for discharging the ripened bolls into the duct above the wheel; and an adjustable air inlet in said duct below said rotary wheel and above said comingled mixture for affecting the intensity of said secondary stream.

2. The structure as set forth in claim 1 in which the blades extend completely across the duct and block the ripe bolls from passing upwardly while permitting air to pass therebetween.

3. The structure as set forth in claim 2 further characterized by a horizontal opening parallel to, and above the cleaner wheel; and a doffer offset from the horizontal opening engaging said blades for sweeping the bolls from said blades through said opening and into the duct.

4. The structure as set forth in claim 3 in which the horizontal opening is beneath the outlet.

5. The structure as set forth in claim 1 further characterized by a second cleaner wheel in material-receiving relation to material passing through the grate structure, a second grate structure disposed alongside the second wheel and doffer means disposed alongside the respective cleaning wheels for removing lint and bolls from the wheels and returning them to the duct above the cleaning wheels.

6. For use with a cotton harvester; a vertically extending duct structure with a lower end adjacent cotton discharge means of the harvester and extending therefrom to an upper discharge end, said duct structure including an upper conduit and a lower chamber in material-receiving relation to the cotton discharge means and opening into the conduit at its lower end; a blower opening into and for directing a blast of air upwardly through the conduit and inducing a secondary air stream in the chamber that draws ripened cotton bolls upwardly; a series of parallel upright rotatable blades rotatably driven and supported in the chamber across said secondary stream and above the cotton discharge means and providing vertical spacings therebetween through which the secondary air stream may pass, each of said blades having peripheral teeth for snagging cotton as it is airborne in the secondary air stream; air adjusting means on the chamber beneath the rotatable blades for adjusting the intensity of the secondary air stream; a grate-like structure alongside the peripheries of said blades on which the cotton is drawn to separate the trash therefrom; and a doffer above said blades removing cotton from the blades and directing it back into the secondary air stream above said blades for passage into the conduit.

* * * * *